Sept. 5, 1950     R. T. FRANZEL ET AL     2,520,923
FORCE MEASURING DEVICE
Filed June 30, 1945
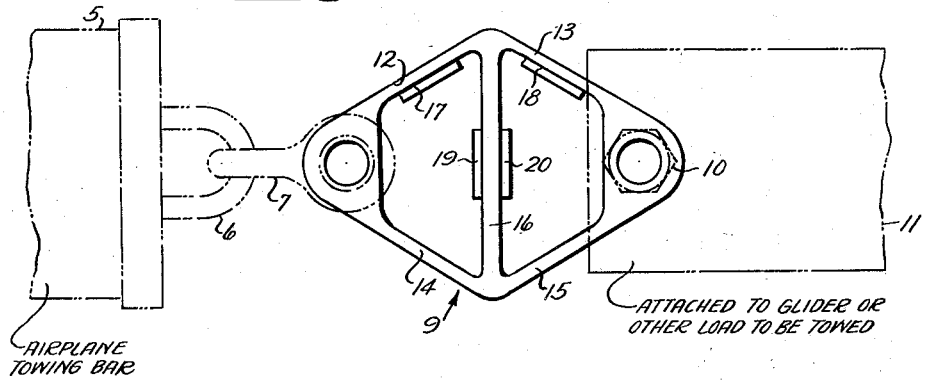
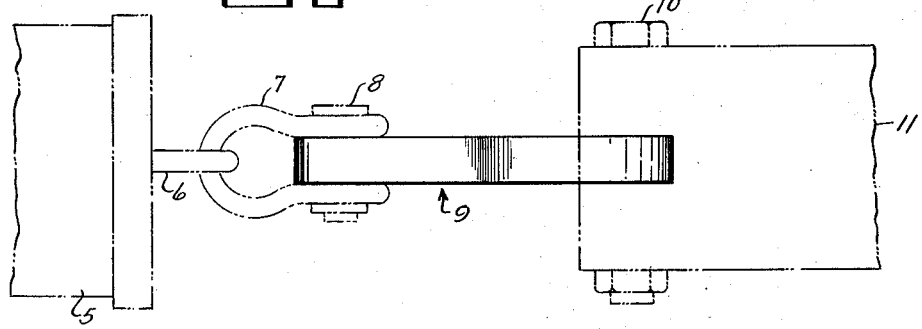
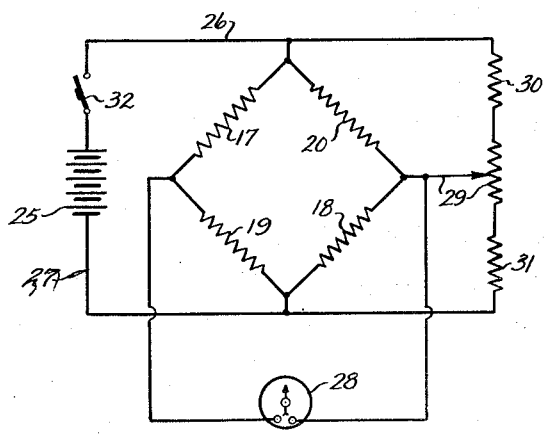
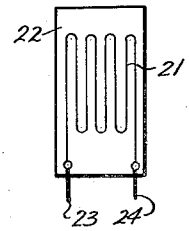
INVENTORS
ROBERT T. FRANZEL
JOHN W. FARRELL
BY
ATTORNEYS Patented Sept. 5, 1950

2,520,923

UNITED STATES PATENT OFFICE 2,520,923

FORCE MEASURING DEVICE

Robert T. Franzel and John W. Farrell,
Dayton, Ohio

Application June 30, 1945, Serial No. 602,622

3 Claims. (Cl. 73—141)

(Granted under the act of March 3, 1883, as
amended April 30, 1928; 370 O. G. 757)

The invention described herein may be manufactured and used by or for the Government for governmental purposes without the payment to us of any royalty thereon.

This invention relates to force measuring devices. One of the important objects of this invention is to provide apparatus which is highly sensitive and accurate for all loadings within the capacity of the apparatus. Another object is to provide apparatus which is not affected by temperature and weather conditions, or mechanical friction and wear. Another object is to provide a device which has an extensive frequency range, as it may give accurate readings even when the loads are rapidly applied. Further objects are to provide a strain measuring device which is simple to make, easy to install and use, is light in weight, occupies little space, and is usable repeatedly without servicing. Other objects will be understood from the following description of the preferred embodiment of the invention shown in the accompanying drawing, wherein—

Fig. 1 is a top plan view of the force measuring device with the wiring omitted, showing in phantom two parts to which the device may be coupled to measure the load between them;

Fig. 2 is a side elevation of the same;

Fig. 3 is a wiring diagram; and

Fig. 4 is a plan view of a typical strain gage, one of four used in the preferred embodiment of the invention.

Referring particularly to the drawing, the rear end of a tow bar 5, whose forward end is secured to the fuselage of an airplane not shown, has a clevis 6 secured by a bolt (not shown) passing through the tow bar, and permitting limited pivotal movement of the clevis. Another clevis 7 is linked to clevis 6, and is pivotally secured by a bolt 8 to one end of the force measuring device 9 which is part of this invention. At the opposite end of the force measuring device, a bolt 10 secures it to the tow bar 11 of a glider, target or other load to be towed by the airplane. The force measuring device is thus directly interposed between the tractor airplane and its load and is subjected to all the loads imposed on the towing gear by the drag or inertia of the load.

The force measuring device consists of a strain gage support, a plurality of strain gages fixed on the support, and connections between the strain gages and a galvanometer, a source of electricity, and a variable potentiometer, all of which are indicated diagrammatically in Fig. 3 and will be presently discribed. The strain gage support is preferably a diamond-shaped, open, rigid frame which may be of cast or forged metal or some other material of adequate strength. The four sides 12, 13, 14 and 15 of the frame provide tension members, while a diagonal or crosspiece 16, whose ends are integrally joined with two of the four corners of the diamond-shaped frame, provides a compression member. Broadly considered, the four-sided frame may be said to comprise two obtuse-angled tension members separated in the middle and joined at both ends, with the compression member connecting the central portions of the tension members. It is believed that maximum sensitivity is obtained by employing the illustrative frame, which has the form of two equilateral triangles arranged base to base, with the crosspiece or compression member 16 providing the common base of the triangles. Any normal stress imposed on the strain gage support by the airplane towing bar and the load will tend to elongate sides 12, 13, 14 and 15 and will tend to contract or compress crosspiece 16.

Secured to the strain gage support are four strain gages 17, 18, 19 and 20. Each strain gage consists of fine wire or filament 21, Fig. 4, arranged in a plurality of flat loops and secured by a plastic glue to a paper or other support 22 which is glued to the test object, leads 23, 24 being soldered to filament 21 and being electrically connected with a circuit to be described. Strain gages depend upon the principle that the resistance of a conductor varies with changes in its cross section and length and while these resistance changes may be very small, they may be accurately measured by instruments which are essentially galvanometers; hence if a strain gage is rigidly mounted on a portion of a stressed member, readings of the resultant strains may be taken. Strain gages are well known, being shown in a number of prior patents, e. g. the Simmons Patent No. 2,292,549 dated August 12, 1942. Gages 17 and 18 are secured as by gluing and taping (not shown) to two of the tension members 12, 13 respectively, while gages 19 and 20 are similarly secured on opposite faces of the compression member 16, and each gage is so arranged that the stress imposed on the gage support subjects the filament to a strain in a direction parallel to the lengths of the filament loops.

A source of electricity, such as a battery 25, is coupled by leads 26, 27 to a Wheatstone bridge circuit including the four strain gages, see Fig. 3, and a galvanometer 28 is also coupled to the Wheatstone bridge circuit, the arrangement being the usual one, with the galvanometer connected to two corners of the bridge and the source of electricity coupled to the other two corners. A variable potentiometer 29 is connected in series with fixed resistances 30, 31, and the three resistance elements are directly coupled with the leads 26, 27 and hence with the Wheatstone bridge, thereby making it possible to balance the bridge by adjusting potentiometer 29 and reading the galvanometer. A switch 32 may disconnect the battery from the several circuits.

When the invention is to be used for measuring the force on a glider towing gear, for example, the galvanometer will be part of a conventional oscillograph which is carried in the fuselage of the towing airplane, and the switches, resistors and connections will be carried in a separate box or casing also carried in the fuselage, with cables leading therefrom to the oscillograph and the leads from the strain gages. Such an arrangement is within the skill of any electrician and hence is not illustrated. Readings may be taken during the flight and the record made may of course be studied after the flight. Engineers may thus determine the forces imposed during acceleration on the ground and take-off as well as during flight under different atmospheric conditions and at different altitudes and gross weights. The invention may also be used in connection with land vehicles and elsewhere where sensitive and accurate stress and strain determinations are desired. It will be understood that if the strain gage support or frame as a whole is subjected to compression, the so-called tension members become compression members and the compression member is subjected to tension.

Advantages are that data obtained are much more accurate, while the procedure itself is simpler and faster than other methods such as the torque-meter method. Temperature and weather conditions will have no effect on the test, as the Wheatstone bridge may be balanced and retain that balance at all ambient temperatures. The strain gages may be easily protected from moisture and damage by wrapping with heavy tape. A particular advantage is that the sensitivity of the apparatus is twice that of a pair of strain gages which are commonly used in obtaining force measurements. Furthermore this sensitivity is constant for all loadings within the capacity of the strain gage support. The device has a very broad frequency range, which makes accurate readings possible even when the loads are rapidly applied. The accuracy of readings is not affected by mechanical friction or wear. The device is simple to make, light in weight, occupies little space and is usable in many different tests on many objects. It has been successfully used to calibrate accelerometers employed in measuring accelerations imposed on objects attached to opening parachutes.

While the described strain gage support carries four strain gages arranged on the four sides of a Wheatstone bridge, it is possible to realize some of the advantages of our invention by employing only two strain gages, one on a tensioned portion of the support, the other on a part which is under compression at the same instant, the two strain gages being coupled in a circuit like that of Fig. 3, with resistance coils, not strain gages, in the positions of gages 18 and 20.

Having described one form of our invention, without limiting ourselves thereto, what we claim as new and desire to secure by Letters Patent is:

1. In a strain gage device for use with a resistance responsive indicating means comprising; a rectangular frame element having a cross member connecting opposite corners and means on the two other opposite corners facilitating coupling said rectangular frame in a load connection whereby the sides of said frame element will be subjected to longitudinal loads opposite simultaneously to the logitudinal loads imposed on said cross member in response to the direction of load in said load connection; and strain gage means mounted on at least one side and strain gage means mounted on said cross member of said frame element, said strain gages constituting strain responsive resistance elements.

2. In a strain gage for use with a Wheatstone bridge indicating device comprising; a frame member resembling two equi-sided triangles with a common integral base, said frame member having means for mechanically coupling the frame member in a load connection at the triangular apex portions opposite said common base; and resistance responsive strain gages mounted on the triangle sides and said common base, said strain gages constituting Wheatstone bridge circuit arms whereby, upon said frame member being subjected to pull, the triangle sides will be tensioned and the common base will be compressed affecting the resistance of the strain gages accordingly.

3. In combination with at least four strain gages coupled together in a Wheastone bridge circuit, a source of current connected to said circuit, a galvanometer connected to said circuit, a variable potentiometer connected across the source of current and to one side of said galvanometer to balance the Wheatstone bridge as determined by said galvanometer, a strain gage frame consisting of a unitary four-sided element with a diagonal member fixed at two of the opposite corners and having coupling means on the two other opposite corners to facilitate mechanically coupling said frame element in a load connection, the effect of a pulling force in the load connection being to tension the sides and compress the diagonal member of said frame element, one pair of said strain gages being rigidly mounted on each of two of said frame element sides and constituting two opposite arms of said Wheatstone bridge, and the other pair of said strain gages being rigidly mounted on said diagonal member and constituting the other two opposite arms of said Wheatstone bridge, such that as pull is exerted in the load connection the resistance in said pair of strain gages on said frame element sides will vary inversely as the resistance in said other pair of strain gages on said diagonal member to produce a change in the balance of the Wheatstone bridge circuit indicated by said galvanometer in accordance with the pulling force in the load connection.

ROBERT T. FRANZEL.
JOHN W. FARRELL.

REFERENCES CITED

The following references are of record in the file of this patent:

UNITED STATES PATENTS

| Number | Name | Date |
| --- | --- | --- |
| 1,912,213 | Nicolson | May 30, 1933 |
| 2,104,688 | Mabboux | Sept. 17, 1935 |
| 2,275,532 | Lamberger et al. | Mar. 10, 1942 |
| 2,322,319 | Ruge | June 22, 1943 |
| 2,360,886 | Osterberg | Oct. 24, 1944 |
| 2,414,161 | Moore | Jan. 14, 1947 |
| 2,426,390 | De Forest | Aug. 26, 1947 |